Feb. 10, 1942.   H. E. ROONEY   2,272,953
SPEED CONTROL MECHANISM FOR VEHICLES
Filed Aug. 8, 1939   2 Sheets-Sheet 2
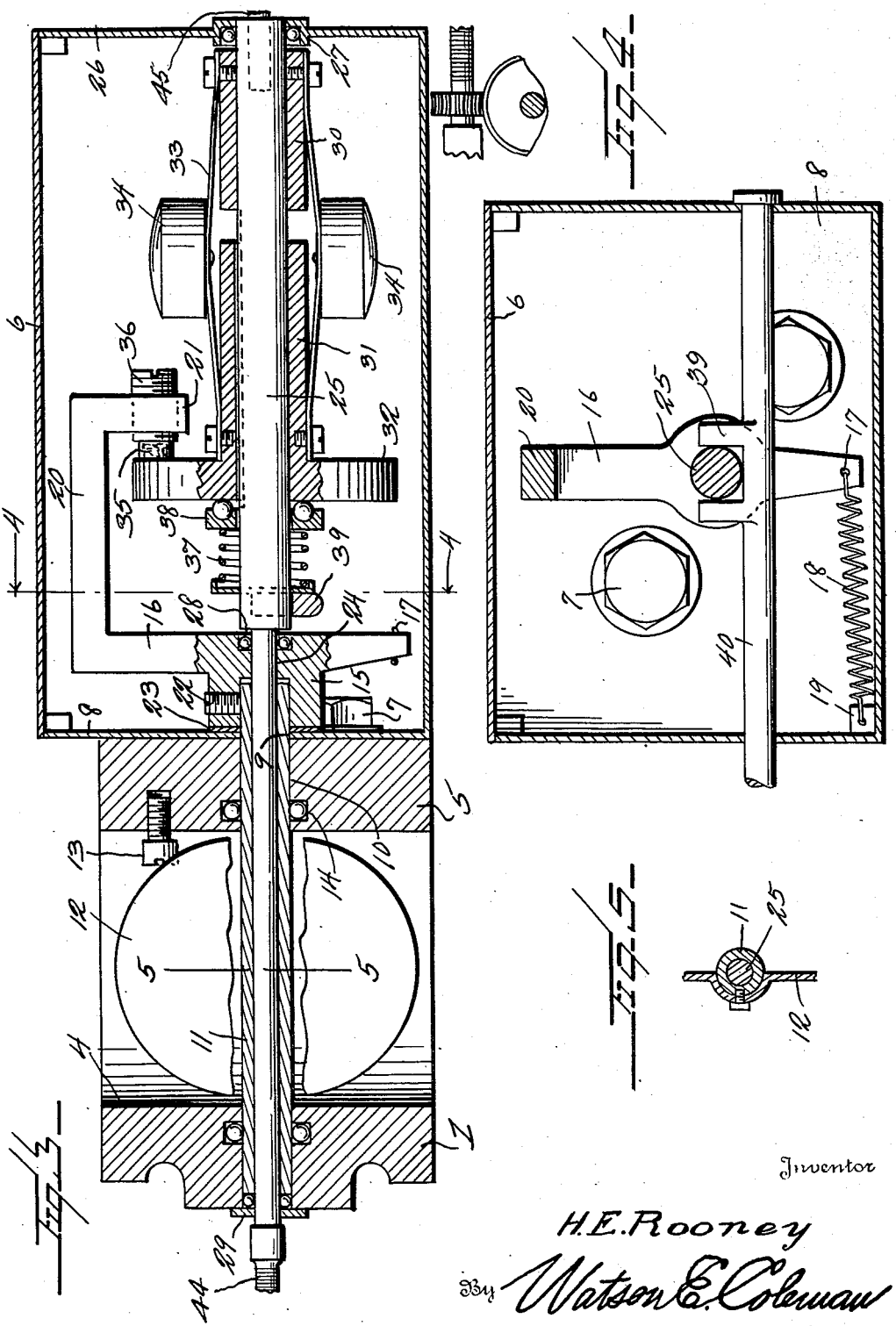
Inventor
H. E. Rooney
By Watson E. Coleman
Attorney Patented Feb. 10, 1942

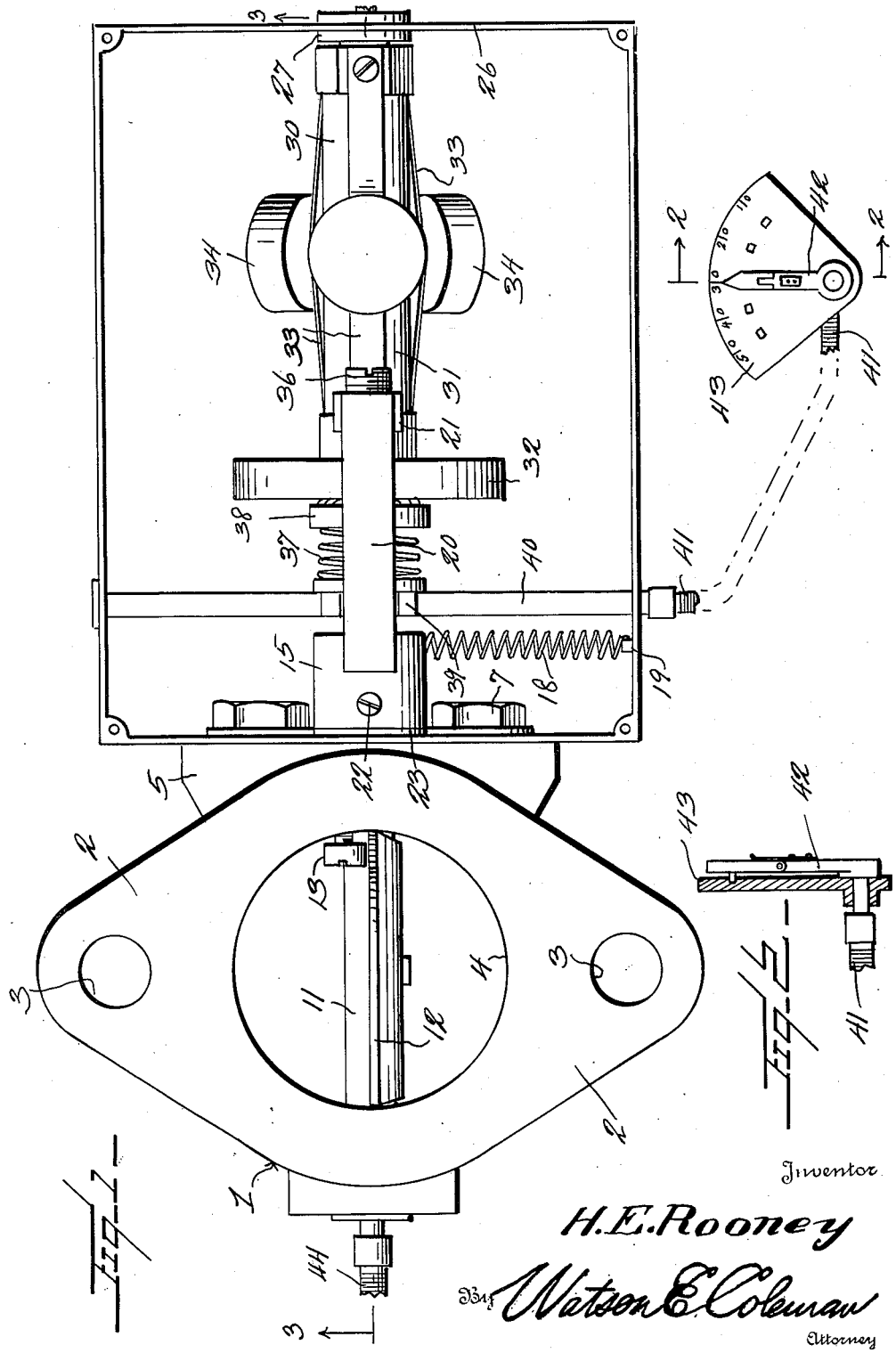

2,272,953

UNITED STATES PATENT OFFICE 2,272,953

SPEED CONTROL MECHANISM FOR VEHICLES

Harry E. Rooney, Haddam, Kans.

Application August 8, 1939, Serial No. 289,026

7 Claims. (Cl. 192—105)

This invention relates to attachments to motor vehicles and pertains particularly to improvements in speed control devices for the same.

The primary object of the present invention is to provide a speed control or governor for motor operated vehicles which, in contradistinction to speed controls or governors of the type at present in use, is controlled by the actual speed of the vehicle over the ground rather than by the motor speed thereby avoiding the undesirable feature attendant upon the use of speed governing devices which limit the motor speed and thereby seriously interfere with the development of maximum motor power.

Another object of the invention is to provide a speed governing device for motor vehicles in which means is provided whereby the setting of the device may be accomplished from a position within the motor vehicle, thus facilitating the adjustment of the mechanism without having to open the housing in which the actual control mechanism is encased.

Still another object of the invention is to provide a motor vehicle speed control device which is constructed to be connected directly with the speedometer operating cable of the motor vehicle so that the device will be accurately controlled to limit the operation of the vehicle to a predetermined speed designated upon an indicator which is coupled with the mechanism.

Still another object of the invention is to provide a speed control device of the character described which is of relatively simple construction and which will function accurately so that it may be relied upon to control the speed of the vehicle in accordance with the setting of the indicator means associated therewith.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings—

Figure 1 is a view in top plan of the device embodying the invention with the cover of the housing removed.

Figure 2 is a sectional view on the line 2—2 of Figure 1.

Figure 3 is a longitudinal section through the control mechanism on the line 3—3 of Figure 1.

Figure 4 is a sectional view on the line 4—4 of Figure 3.

Figure 5 is a section on the line 5—5 of Figure 3.

Referring now more particularly to the drawings, the numeral 1 designates a sleeve unit designed to be inserted between a motor vehicle engine intake manifold and the carburetor, the sleeve being provided with the oppositely disposed ears 2 having bolt apertures 3 through which securing bolts may be passed for coupling the device between the manifold and carburetor and for securing the carburetor in operating position. The sleeve has a passage or opening 4 therethrough which is of a diameter corresponding to the diameter of the outlet of the carbureter.

At one side of the sleeve 1 a boss 5 is formed to which is secured a housing 6 by means of the stud bolts 7. These bolts pass through one side wall of the housing, which wall is secured against the boss 5.

The inner side wall 8 of the housing 6 has a shaft opening 9 therethrough which alines with alined passages or openings 10 formed through the sleeve and the sleeve passages or openings have supported therein a tubular shaft 11 which extends diametrically through the sleeve passage 4 and which carries a butterfly valve 12. A stop screw 13 secured in the wall of the passage 4 limits the rotary movement of the butterfly valve in one direction. The butterfly valve shaft is supported in suitable bearings 14 and has one end extended through the casing wall 8 into the casing where it enters a collar 15 which is formed integrally with a crank arm 16. This crank arm at one end has an aperture 17 in which is engaged an end of a contractile spring 18, the other end of the spring being joined at 19 to an adjacent wall of the housing, while the opposite end of the arm 16 carries an angular extension 20 which terminates in the reversely bent terminal finger 21 which is in spaced parallel relation with the arm 16.

The collar 15 is firmly secured to the tubular shaft 11 which carries the butterfly valve, by a set screw 22 or by any other suitable means, and a washer 23 of suitable character is inserted between the collar 15 and the adjacent wall 8 of the housing.

The arm 16 is provided with a transverse passage 24 which is coaxial with the collar 15 and with the tubular shaft to which the collar is secured and there extends through the tubular shaft and through the passage 24, a shaft 25 which extends from the side of the sleeve remote from the casing 6 to the wall 26 of the casing which is remote from the sleeve, in which wall it is supported in a bearing 27. There is also provided a bearing for this main shaft 25, at 28 in the arm 16 and at 29 in the wall of the sleeve remote from the casing.

Secured to the main shaft 25 within the casing and remote from the arm 16 is a collar 30 which is held against movement on the shaft and opposing this collar on the shaft 25 is a sliding collar 31 with which is integrally formed a friction disk 32. The spring bows 33 join the collars 30—31 and carry centrifugal weights 34. The friction disk has its periphery in overlapping relation with the finger 21 and is engaged on the face nearest the weights 34 by a felt friction pad 35 which is adjustably carried in a screw 36 which is threaded through the finger 21.

Supported upon the shaft 25 between the friction disk 32 and the arm 16 is a coil expansion spring 37 which at one end bears against an anti-friction unit 38 which engages the adjacent face of the friction disk 32. At the opposite end of this expansion spring 37 there is an actuating fork 39 which straddles the shaft 25 and which is supported upon a rock shaft 40. This shaft 40 is coupled by a suitable flexible cable or shaft 41 with an indicator 42 which may be located within the vehicle upon which the device is mounted, the indicator having associated therewith a dial 43 on which are placed numerals representing miles per hour so as to facilitate the setting of the device for the control of the operating speed of the vehicle. By the rotation of the shaft 41, the shaft 40 will be rocked causing the spring 37 to be compressed against the disk 32. Without compression of the spring 37 by the fork 39 there is insufficient friction between the disk and the friction pad 35 to effect the turning of the butterfly valve to closed position when the shaft 25 is rotated.

The device is connected between the vehicle speedometer and the driving gear of the vehicle from which the speedometer is operated and as is shown in Figs. 1 and 2, one end of a flexible cable of the character commonly employed in association with speedometers is connected as indicated at 44 with an end of the main shaft 25 of the device. This cable or shaft may extend to the speedometer of the vehicle. At the opposite end of the shaft 25 there is attached an end of a similar cable, a portion only of which is shown and which is indicated by the numeral 45, which latter cable is connected with the usual gear or drive means from which the speedometer of the vehicle is operated. By this arrangement, it will be seen that the shaft 25 of the speed control device will be operated or turned at exactly the same speed as the speedometer shaft so that an accurate operation of the control device will result.

It will be readily apparent from the foregoing that when the device has been set to limit the motor vehicle speed to a certain number of miles per hour, the spring 37 will bear with a certain amount of pressure against the disk 32 and will thus assist in the shifting of this disk toward the friction pad 35 as the centrifugal weights are turned by the rotating shaft 25. When, through centrifugal action combined with the action of the spring 37 against the disk 32, the disk is moved into sufficiently firm contact with the friction pad 35, the arm 16 will be turned against the resistance of the spring 18. This spring normally holds the tubular shaft 11 on which the butterfly valve is mounted in a position where the butterfly valve will be disposed vertically in the sleeve passage 4 or, in other words, will be in fully opened position, but when rotation is imparted to the shaft 11 through sufficiently strong frictional engagement between the pad 35 and the disk 32, the butterfly valve will be turned against the resistance of the spring 18 to partially or fully close the passage 4, thus controlling the flow of fuel mixture from the carburetor of the engine into the intake manifold and thereby limiting the speed of the machine.

It will be noted that the present device does not limit the speed of operation of the motor vehicle engine independently of the speed of movement of the machine itself and, therefore, it will be readily seen that the power output of the engine can be increased where necessary without interference from the present speed control device so long as the speed of movement of the vehicle itself over the ground is not above the maximum speed indicated upon the speed indicating dial 43. Thus, it will be seen that when it becomes necessary to speed up the motor vehicle engine in association with which the present device is used, as in climbing a steep grade or in any other situation where a development of high power is necessary, this will not be interfered with by the control device because the device only operates to throttle the engine when the vehicle itself is travelling beyond a predetermined speed.

In connection with the indicating device by which the control mechanism is set to govern the speed of the vehicle, any suitable means may be employed for securing the indicator button or the flexible shaft 41 with which the button is connected, after the desired setting of the button has been made so that the shaft 40 will be held against reverse oscillation by the expansion spring. This securing means for the button may be in the form of a simple latch or a key controlled lock by means of which the device may be secured after it has been set to control the speed of the vehicle, so that such setting cannot be altered by unauthorized persons.

I claim:

1. A device of the character described, comprising a tubular rotatably supported shaft, a second shaft extending through said tubular shaft, said second shaft being designed for connection with a rotating shaft, a centrifugal governor supported upon the second shaft and including a shiftable sleeve, a disk connected with said sleeve to rotate coaxially therewith, an arm secured to said tubular shaft to turn therewith, a friction pad carried by the arm and disposed adjacent a face of the disk for engagement therewith when the disk is shifted on the second mentioned shaft under the action of said centrifugal governor whereby operative coupling together of the two shafts is effected, and spring means carried with said arm and normally urging the rotation of the first shaft in a direction opposite to the rotation of the second shaft.

2. A device of the character described, comprising a tubular rotatably supported shaft, a second shaft extending through said tubular shaft, said second shaft being designed for connection with a rotating shaft, a centrifugal governor supported upon the second shaft and including a shiftable sleeve, a disk connected with said sleeve to rotate coaxially therewith, an arm secured to said tubular shaft to turn therewith, a friction pad carried by the arm and disposed adjacent a face of the disk for engagement therewith when the disk is shifted on the second mentioned shaft under the action of said centrifugal governor, spring means connected with said arm and normally urging the rotation of the first shaft in a direction opposed to the rotation of the sleeve and disk, a coil spring encircling said second mentioned shaft and engaging the side of the disk opposite from the centrifugal governor, and means operable from a remote point to effect the compression of said coil spring against said disk to urge the same to move toward said friction pad.

3. A shaft rotation control device, comprising a rotatably supported shaft, a centrifugal governor including a rotary disk member mounted for movement axially of said shaft under the effect of centrifugal force, an element secured to said shaft to turn therewith and including a friction member disposed adjacent the leading face of the said disk when the disk is moved under the action of said force, manual means for moving said rotary disk against the friction element, and means for coupling a rotating driving shaft with the governor.

4. A shaft rotation control device, comprising a rotatably supported tubular shaft, a rotary shaft extending through the tubular shaft and rotatably supported therein and having an end extended beyond the tubular shaft, means for connecting a rotating driving shaft with an end of the rotary shaft, a centrifugal governor supported upon the extended portion of the rotary shaft and including a sleeve slidable on said portion, a friction disk carried by said sleeve, an arm secured to the tubular shaft and having a portion extending across one face of the disk, a friction member carried by the arm for contact with the other disk face, resilient means normally urging rotation of the tubular shaft and the arm in a direction opposite to that in which the tubular shaft is turned after engagement of the disk and friction member, and manual means coupled with said disk for effecting the movement of the disk toward the friction members independently of the action of the governor.

5. A shaft rotation control device, comprising a rotatably supported shaft, a collar secured to an end of the shaft and supporting an arm radially offset from the shaft and extending longitudinally thereof and terminating in an inwardly directed finger, a rotatable shaft supported coaxially with the first shaft, a centrifugal governor mounted upon the rotary shaft and including a sleeve movable longitudinally of the rotary shaft between the latter and said finger, a friction disk carried by said sleeve and having said finger extending across one side face thereof, a friction member carried by the finger for engagement with the said face of the disk, means for connecting a rotating driving shaft with the rotary shaft, manually operable means for shifting said disk relative to the friction element independently of the action of the governor, and resilient means normally urging rotation of the first-mentioned shaft in the opposite direction to its movement after engagement of the disk and friction member.

6. A shaft rotation control device, comprising a rotatably supported shaft, a collar secured to an end of said shaft, an arm carried by the collar and extending radially and joining an angularly directed portion extending longitudinally of the shaft, said last portion terminating in an inturned finger extending radially with respect to the shaft, a rotary shaft supported coaxially with the first shaft and having an end rotatably joined to the collar, a centrifugal governor mounted upon the rotary shaft and including a sleeve slidable on the rotary shaft between the latter and the end of said finger, a disk carried by the sleeve and having its peripheral portion disposed between the finger and the arm, a friction member carried by the finger for contact with the adjacent face of the disk, manually operable means operatively coupled with the disk for effecting movement of the latter toward the friction member independently of the action of the governor, and resilient means normally urging rotation of the first shaft in the direction opposite to that in which it is moved by the rotary shaft on the engagement of the disk with the friction member.

7. A shaft rotation control device, comprising a rotatably supported shaft, a collar secured to an end of said shaft, an arm carried by the collar and extending radially and joining an angularly directed portion extending longitudinally of the shaft, said last portion terminating in an inturned finger extending radially with respect to the shaft, a rotary shaft supported coaxially with the first shaft and having an end rotatably joined to the collar, a centrifugal governor mounted upon the rotary shaft and including a sleeve slidable on the rotary shaft between the latter and the end of said finger, a disk carried by the sleeve and having its peripheral portion disposed between the finger and the arm, a friction member carried by the finger for contact with the adjacent face of the disk, manual means for shifting said disk into engagement with the friction member, comprising a collar encircling the rotary shaft and having anti-friction connection with a face of the disk, a coil spring encircling the rotary shaft and engaging at one end against said last collar, means for effecting the compression of the coil spring against the last collar, and spring means normally urging rotation of the first shaft in a direction opposite to that in which it is rotated by the rotary shaft after engagement of the disk with the friction member.

HARRY E. ROONEY.